US012767616B2

(12) United States Patent
Denisov et al.

(10) Patent No.: US 12,767,616 B2
(45) Date of Patent: Oct. 20, 2026

(54) COMPOUND LIQUID FERTILIZER

(71) Applicants: STAB C.S. JSC, Vilnius (LT); Albert Nikolaevich Denisov, Barnaul (RU)

(72) Inventors: Albert Nikolaevich Denisov, Barnaul (RU); Leonid Vasil'evich Tugarinov, Saint-Petersburg (RU)

(73) Assignees: STAB C.S. JSC, Vilinius (LT); Denison Albert Nikolaevich, Barnaul (RU)

( * ) Notice: Subject to any disclaimer, the term of this patent is extended or adjusted under 35 U.S.C. 154(b) by 358 days.

(21) Appl. No.: 18/571,711

(22) PCT Filed: Mar. 21, 2022

(86) PCT No.: PCT/RU2022/050091
§ 371 (c)(1),
(2) Date: Dec. 18, 2023

(87) PCT Pub. No.: WO2023/003492
PCT Pub. Date: Jan. 26, 2023

(65) Prior Publication Data

US 2024/0336540 A1 Oct. 10, 2024

(30) Foreign Application Priority Data

Jul. 19, 2021 (RU) ................................ 2021121353

(51) Int. Cl.

| | |
|---|---|
| ***C05G 5/27*** | (2020.01) |
| ***A01N 59/16*** | (2006.01) |
| ***A01P 1/00*** | (2006.01) |
| ***A01P 7/02*** | (2006.01) |
| ***A01P 7/04*** | (2006.01) |
| ***C05C 3/00*** | (2006.01) |
| ***C05C 5/00*** | (2006.01) |
| ***C05C 11/00*** | (2006.01) |
| ***C05D 9/02*** | (2006.01) |

(52) U.S. Cl.
CPC ............... *C05G 5/27* (2020.02); *A01N 59/16* (2013.01); *A01P 1/00* (2021.08); *A01P 7/02* (2021.08); *A01P 7/04* (2021.08); *C05C 3/00* (2013.01); *C05C 5/00* (2013.01); *C05C 11/00* (2013.01); *C05D 9/02* (2013.01)

(58) Field of Classification Search
CPC ..... C05G 5/27; A01P 7/04; A01P 7/02; A01N 59/16; C05C 3/00; C05C 5/00; C05C 11/00; C05D 9/02
See application file for complete search history.

(56) References Cited

U.S. PATENT DOCUMENTS

2007/0036832 A1 2/2007 Williams et al.
2013/0219979 A1 8/2013 Calcutta

FOREIGN PATENT DOCUMENTS

RU 2644013 C2 7/2018

OTHER PUBLICATIONS

Krutyakov et al. (Tallow amphopolycarboxyglycinate-stabilized silver nanoparticles: new frontiers in development of plant protection products with a broad spectrum of action against phytopathogens), Mater. Res. Express 3 (2016) 075403.*
Sekhon (Chelates for Micronutrient Nutrition among Crops), Resonance Jul. 2003.*
Nikitina L. Premera: Zeromiks Alfa—Novy Preparat Na Osnove Kolloidnogo Serebra, Agrarnaya politika, N 6, Jul. 2020, pp. 2-3.

* cited by examiner

*Primary Examiner* — Zohreh A Fay
(74) *Attorney, Agent, or Firm* — NEXUS IP LAW PLC

(57) ABSTRACT

The invention relates to agriculture. The liquid complex fertilizer contains colloidal silver and a complex of macro- and microelements in salt form, as well as in the form of chelate—metal-ethylenediaminetetraacetic acid, while it additionally contains sodium tallow amphopolycarboxyglycinate, polyvinylpyrrolidone, water, pre-structured with shungite. All components are taken at a certain ratio. The invention makes it possible to increase the following: acaricidal activity against the common spider mite, the insecticidal activity against the common potato aphid, the antiviral activity against the tomato yellow leaf curl virus, and also the stability of the fertilizer as a colloidal system.

3 Claims, No Drawings

COMPOUND LIQUID FERTILIZER

TECHNICAL FIELD

The invention relates to agriculture, namely to liquid complex fertilizers containing colloidal silver, which help increase productivity and are also intended for use together with acaricides and insecticides.

PRIOR ART

The use of silver in the form of an aqueous solution of silver ions is known from the prior art [https://www.urozhayxxi.com/juss-argentum-agro]. The mechanism of action of the product is that silver ions are fixed and retained on the cell walls of phytopathogenic microorganisms, penetrate their cell wall, and suppress their reproduction. The disadvantage of this approach is that silver in the form of ions is very actively and quickly absorbed by dust and other microparticles, and is also exposed to insolation in the sun. This results in the protective effect being short-term. Moreover, silver ions, without a substance or form to deliver them, have difficulty penetrating plant tissue. This also limits the use of the product as a plant growth regulator, as well as when used in conjunction with fungicides.

A composition is known from the prior art, including a chelate form of $Ag^{+}$ and $Cu^{2+}$ ions and containing fulvic acid $C_{135}H_{182}O_{95}N_5S_2$ as a chelating agent, while it additionally includes 25% of a concentrate of organic matter containing fulvic and amino acids, organic, humic and folic acids, as well as easily accessible for plants: nitrogen at a concentration of 1.25 g/l, phosphorus at a concentration of 5.5 g/l, potassium at a concentration of 10 g/l, calcium at a concentration of 0.3 g/l, silicon at a concentration of 4 mg/l, iron in concentration 0.5 g/l, magnesium at a concentration of 55 mg/l, molybdenum at a concentration of 0.01 mg/l, manganese at a concentration of 0.02 mg/l, zinc at a concentration of 9 mg/l, boron at a concentration of 1 mg/l, sodium at a concentration of 2.3 g/l, sulfur at a concentration of 0.1 g/l, selenium at a concentration of 0.02 g/l, as well as gibberelins, auxins, indolyl-3-butyric acid, and cytokinins [RU 2738483, IPC C05F 11/00, A01N 59/00, A01P 3/00, A01P 21/00, publ. Dec. 14, 2020].

The composition is active as a pesticide with a fairly long-lasting effect, and is also an effective agent for stimulating plant growth.

The closest to the claimed invention is a liquid complex fertilizer containing colloidal silver and a complex of macro- and microelements in salt form, as well as in the form of metal-ethylenediaminetetraacetic acid chelates, and the content of active substances is, g/l: silver—0.5, boron—2, copper—9, zinc—4.5, manganese—9, molybdenum—3, cobalt—0.3, magnesium—2, iron 2, potassium—4 [https://tdahp.ru/pestitsidy/zeromix-alpfa/].

The fertilizer has a complex effect aimed at increasing productivity, and also enhances the effect of chemical fungicides when used together with fertilizer.

The disadvantages of the compositions and fertilizers described above are the relatively low biocidal activity against the common spider mite, the common potato aphid, the tomato yellow leaf curl virus, as well as the insufficient stability of the compositions.

BRIEF SUMMARY

The objective of the invention is to create a fertilizer that has a complex, prolonged effect aimed at increasing crop productivity, as well as insecticidal and antiviral activity.

The technical result is to increase the following: acaricidal activity against the common spider mite, insecticidal activity against the common potato aphid., antiviral activity against the tomato yellow leaf curl virus, stability of the fertilizer as a colloidal system, as well as to decrease the rate of input of acaricides and insecticides when combined with fertilizer.

The technical result is achieved by the fact that the liquid complex fertilizer contains colloidal silver and a complex of macro- and microelements in salt form, as well as in the form of metal-ethylenediaminetetraacetic acid chelates, while it additionally contains sodium tallow amphopolycarboxyglycinate, polyvinylpyrrolidone, and the water is prestructured with shungite with the following content of components, g/l:

| | |
|---|---|
| Silver nitrate | 0.9-6 |
| Sodium borohydride | 0.4-2.8 |
| Sodium tall amphopolycarboxyglycinate | 7-46 |
| Polyvinylpyrrolidone | 5-80 |
| Ammonium molybdate | 1.8-7 |
| Sodium octaborate tetrahydrate | 11-40 |
| Copper chelate | 33-70 |
| Zinc chelate | 23-70 |
| Manganese chelate | 27-82 |
| Cobalt chelate | 7-35 |
| Structured water | 561.2-883.9 |

DETAILED DESCRIPTION

Liquid complex fertilizer is an aqueous colloidal solution, the active substance of which is nanosized silver particles stabilized by polymers, ensuring their optimal interaction with the leaf surface, and contains macro- and microelements in salt and chelate forms. The fertilizer is an effective means for correcting leaf nutrition of plants, treating seeds and seeding material for potatoes, vegetables, fruits, rapeseed, etc. The use of modified nanosized silver particles significantly increases the area of their contact with the plant cuticle, enhances the transport of nutrients and their absorption by the plant. This makes it possible to obtain high biological efficiency in low concentrations, which makes the use of fertilizer cost-effective with minimal risks to the environment.

The production of complex liquid fertilizer includes several stages.

At the first stage, water is structured with shungite, which includes three stages. At the first stage, process water is prepared by reverse osmosis to the demineralized water standard. Then water treatment of demineralized water is carried out by settling in a shungite filter for 24 hours, while the size of shungite particles in the filter is from 0.5 to 2 cm. At the final stage, the water is structured by simultaneously feeding water obtained in the second stage and shungite particles no larger than 0.01 mm in size into the dispersant.

Shungite is a natural composite, the structure of which is an amorphous microporous quartz frame filled with highly dispersed (about 1 micron) particles of aluminosilicate minerals. One of the active components of shungite is fullerene-like structures. Water obtained at the first stage has the structure of a molecular colloidal solution of hydrated fullerene-like particles that affect harmful microflora, plant spores, algae, viruses, biological toxins, as well as helminth eggs. In addition, water is additionally mineralized due to the macro- and microelements included in shungite.

At the second stage, silver is synthesized in nanosized form. The mixing reactor is filled with water structured at the first stage, in which silver nitrate is dissolved. Then, water prepared at the first stage is poured into a separate container No. 1 with a volume of 1.5 $m^3$ and sodium tall amphopolycarboxyglycinate (Ampholac 7-TX) is added with stirring. After mixing, the Ampholac 7-TX solution is pumped into a mixing reactor using a pump. The temperature in the reactor should be in the range of 15-25° C. and constantly monitored. In container No. 2 with a volume of 1.5 $m^3$, water structured at the first stage is also poured and a portion of sodium borohydride is sprinkled. After complete dissolution of sodium borohydride, the mixture is fed into a mixing reactor. At the end of the synthesis process in a mixing reactor, a homogeneous transparent light brown liquid is obtained.

In the synthesis of silver in nanosized form, sodium borohydride serves as a reducing agent for silver nitrate. Ampholac 7-TX is an amphoteric surfactant allowing to stabilize a highly dispersed colloidal system including nanosized silver particles. The resulting system has high aggregative stability in a wide pH range (4-12), is capable of redispersing after drying, tolerates repeated freezing/thawing, and is insensitive to the effects of anions and single charged cations.

At the third stage, the colloidal system obtained in the second stage is saturated with nutrients, which are macro- and microelements in salt and chelate forms. Before adding nutrients, polyvinylpyrrolidone is added to the mixing reactor and stirred until completely dissolved. Ammonium molybdate, sodium octaborate tetrahydrate, copper chelate, zinc chelate, manganese chelate and cobalt chelate are then added to the reactor alternately. The mixing time for all components is at least one hour.

Polyvinylpyrrolidone acts as an additional stabilizing agent of the colloidal system, preventing the formation of large agglomerates of dispersed particles and their precipitation. As a result, the introduction of this compound into the solution makes it possible to prolong the biocidal effect of the fertilizer.

The use of copper, zinc, manganese and cobalt chelates in fertilizers is preferable due to the high absorption of chelate complexes by plants compared to free metal ions.

At the final stage of fertilizer production, end product is bottled. After all nutrients are completely dissolved in the mixing reactor, a sample is taken for analysis in the laboratory. Next, if the quality of the end product meets all requirements, the fertilizer is pumped into a filling container. The end product is filled on automated lines into plastic canisters.

The following fertilizer compositions were obtained using the above method (see Table 1)

TABLE 1

Fertilizer compositions.

| Component | Component content, g/l | | | | |
|---|---|---|---|---|---|
| | Composition 1 | Composition 2 | Composition 3 | Composition 4 | Composition 5 |
| Silver nitrate | 0.9 | 2 | 4.5 | 5 | 6 |
| Sodium borohydride | 0.4 | 1 | 1.6 | 2.3 | 2.8 |
| Sodium tall amphopolycarboxyglycinate | 7 | 10 | 25 | 33 | 46 |
| Polyvinylpyrrolidone | 5 | 17 | 38 | 67 | 80 |
| Ammonium molybdate | 1.8 | 3 | 5.3 | 6.1 | 7 |
| Sodium octaborate tetrahydrate | 11 | 15 | 27 | 35 | 40 |

TABLE 1-continued

Fertilizer compositions.

| Component | Component content, g/l | | | | |
|---|---|---|---|---|---|
| | Composition 1 | Composition 2 | Composition 3 | Composition 4 | Composition 5 |
| Copper chelate | 33 | 45 | 53 | 64 | 70 |
| Zinc chelate | 23 | 34 | 43 | 59 | 70 |
| Manganese chelate | 27 | 36 | 48 | 72 | 82 |
| Cobalt chelate | 7 | 18 | 26 | 30 | 35 |
| Structured water | 883.9 | 819 | 728.6 | 626.6 | 561.2 |
| Total: | 1000 | 1000 | 1000 | 1000 | 1000 |

To confirm the acaricidal effectiveness of the fertilizer against the common spider mite, as well as the insecticidal effectiveness against the common potato aphid, laboratory studies were carried out.

The studies were carried out according to standard methods for assessing the toxicity of pesticides for arthropods using different methods of treating experimental arthropods in order to select the optimal method of applying it to the test object, which would maximize the biological activity of the fertilizer—dipping the leaves of the forage plant into fertilizer solutions of different concentrations, followed by planting test objects on them or dipping parts of the forage plant populated with test objects into the said solutions.

All experimental variants were performed in 3-4 repetitions. After treatment, the arthropods were kept under thermostatic conditions in cages. The duration of observations of surviving individuals depended on the test object and stopped after the onset of high mortality in the control or the appearance of individuals of the next generation. In all variants of the experiment, a control was necessarily provided—a variant with water treatment.

An indicator of the biological activity of the fertilizer was a decrease in the number of experimental individuals relative to the initial one, adjusted for control according to the standard Henderson-Tilton formula:

$$BA(\%)=100\cdot(1-I_{after}\cdot C_{before}/I_{before}\cdot C_{after}),\text{ where}$$

BA—biological activity, expressed as a percentage reduction in abundance adjusted for control; $I_{before}$ is the number of living individuals in the experiment before treatment; $I_{after}$ is the number of living individuals in the experiment after treatment; $C_{before}$ is the number of living individuals in the control before treatment, $C_{after}$ is the number of living individuals in the control after treatment.

To assess the ovicidal effect of the fertilizer on the eggs of the common spider mite, bean leaves were colonized with 5 fertilized females, which were removed after a day. Leaves with one-day eggs were treated by immersing them in aqueous solutions of fertilizer of different concentrations. Observations carried out over 11 days revealed that the development of experimental eggs of the autumn generation was slowed down, almost 2 times, in comparison with the summer ones. Against this background, during the accounting period, almost complete (94.9-100%) hatching of larvae from eggs occurred in all variants of the experiment, regardless of the concentration tested (see Table 2). Thus, it was found that the fertilizer does not have an ovicidal effect on the eggs of the common spider mite.

TABLE 2

Toxicity of fertilizer towards eggs of common spider mite (laboratory experiment)

| Test variant | Repetition | Egg count per leaf before treatment | Egg count per leaf after treatment by day of registration 8 | 11 | % eggs hatched from larvae 8 | 11 |
|---|---|---|---|---|---|---|
| Dipping populated leaf eggs in 0.01% aqueous fertilizer solution | 1 | 7 | 3 | 7 | 42.9 | 100 |
| | 2 | 9 | 3 | 9 | 33.3 | 100 |
| | 3 | 12 | 3 | 12 | 25.0 | 100 |
| | 4 | 10 | 4 | 10 | 40.0 | 100 |
| | avg. | 9.5 | 3.3 | 9.5 | 35.3 | 100 |
| Dipping populated leaf eggs in 0.1% aqueous fertilizer solution | 1 | 22 | 4 | 21 | 18.2 | 95.5 |
| | 2 | 13 | 4 | 13 | 30.8 | 100 |
| | 3 | 17 | 5 | 16 | 29.4 | 94.1 |
| | 4 | 20 | 4 | 18 | 20.0 | 90.0 |
| | avg. | 18.0 | 4.3 | 17.0 | 24.6 | 94.9 |
| Dipping populated leaf eggs in 1% aqueous fertilizer solution | 1 | 25 | 5 | 22 | 20.0 | 88.0 |
| | 2 | 24 | 8 | 24 | 33.3 | 100 |
| | 3 | 20 | 7 | 20 | 35.0 | 95.0 |
| | 4 | 19 | 6 | 19 | 31.6 | 100 |
| | avg. | 22.0 | 6.5 | 21.0 | 30.0 | 95.8 |
| Control | 1 | 17 | 3 | 17 | 17.6 | 100 |
| | 2 | 14 | 3 | 14 | 28.6 | 100 |
| | 3 | 10 | 4 | 10 | 30 | 100 |
| | 4 | 11 | 4 | 11 | 36.4 | 100 |
| | avg. | 13.0 | 3.5 | 13.0 | 28.2 | 100 |

An assessment of the effect of the fertilizer on the imago of the common spider mite using different treatment methods revealed the presence of contact toxic properties of the fertilizer in relation to this phase of pest development. At the same time, it was found that the toxic properties of the fertilizer are most fully manifested when mites are directly treated (dipping leaves populated with imagoes in fertilizer solutions) than when planted on the surface of a food plant treated with fertilizer (see Table 3). However, the toxicity values with the optimal method of applying the fertilizer at 1% concentration did not exceed 50%.

TABLE 3

Toxicity of fertilizer for imago spider mites under different treatment methods (laboratory experiments)

| Test variant | Repetition | Imago count per leaf by day of registration: before treatment | after treatment 3 | 5 | 7 | Decrease in number of mites to the initial one, adjusted for control, %, after treatment by day of registration 3 | 5 | 7 |
|---|---|---|---|---|---|---|---|---|
| Planting imagoes on a leaf treated with the fertilizer solution | | | | | | | | |
| Dipping the leaf in a 0.75% aqueous fertilizer solution | 1 | 17 | 16 | 40 | 116 | 5.9 | 20.3 | 24.0 |
| | 2 | 10 | 8 | 34 | 105 | 20.0 | 0 | 0 |
| | 3 | 9 | 9 | 16 | 101 | 0 | 2.2 | 0 |
| | avg. | 11.0 | 11.0 | 33.3 | 107.3 | 8.6 | 7.7 | 8.0 |
| Dipping the leaf in a 1% aqueous fertilizer solution | 1 | 19 | 13 | 31 | 93 | 31.6 | 44.8 | 45.5 |
| | 2 | 15 | 12 | 24 | 86 | 20.0 | 45.8 | 36.2 |
| | 3 | 9 | 9 | 25 | 81 | 0 | 5.9 | 0 |
| | avg. | 14.3 | 11.3 | 26.7 | 86.7 | 17.2 | 32.2 | 27.2 |
| Control | 1 | 15 | 15 | 45 | 126 | — | — | — |
| | 2 | 13 | 13 | 38 | 138 | — | — | — |
| | 3 | 17 | 17 | 50 | 140 | — | — | — |
| | avg. | 15.0 | 15.0 | 44.3 | 137.8 | — | — | — |
| Treatment of a leaf populated by imagoes | | | | | | | | |
| Dipping an imago-populated leaf in 0.75% aqueous fertilizer solution | 1 | 10 | 6 | 32 | 61 | 40.0 | 12.3 | 25.6 |
| | 2 | 10 | 7 | 39 | 48 | 30.0 | 0 | 41.5 |
| | 3 | 10 | 6 | 40 | 56 | 30.0 | 0 | 31.7 |
| | 4 | 10 | 6 | 28 | 58 | 40.0 | 23.3 | 29.3 |
| | avg. | 10.0 | 6.3 | 34.8 | 55.8 | 35.0 | 8.9 | 32.0 |
| Dipping an imago-populated leaf in 1% aqueous fertilizer solution | 1 | 10 | 5 | 25 | 46 | 50.0 | 31.5 | 43.9 |
| | 2 | 10 | 6 | 24 | 44 | 40.0 | 34.2 | 50.0 |
| | 3 | 10 | 6 | 27 | 44 | 40.0 | 26.0 | 46.3 |
| | 4 | 10 | 4 | 21 | 36 | 60.0 | 42.5 | 56.1 |

TABLE 3-continued

Toxicity of fertilizer for imago spider mites under different treatment methods (laboratory experiments)

| Test variant | Repetition | Imago count per leaf by day of registration | | | | Decrease in number of mites to the initial one, adjusted for control, %, after treatment by day of registration | | |
|---|---|---|---|---|---|---|---|---|
| | | before treatment | after treatment | | | | | |
| | | | 3 | 5 | 7 | 3 | 5 | 7 |
| | avg. | 10.0 | 5.3 | 24.3 | 41.8 | 47.5 | 33.6 | 49.1 |
| Control | 1 | 10 | 10 | 36 | 88 | — | — | — |
| | 2 | 10 | 10 | 37 | 68 | — | — | — |
| | 3 | 10 | 10 | 41 | 82 | — | — | — |
| | 4 | 10 | 10 | 32 | 90 | — | — | — |
| | avg. | 10.0 | 10.0 | 36.5 | 82.0 | — | — | — |

An increase in fertilizer concentrations in the range from 5 to 20% contributed to a gradual increase in its toxicity.

However, this increase was insignificant and reached an average of only 73.4% when treated with 20% fertilizer concentration (see Table 4).

TABLE 4

Toxicity of fertilizer to imago common spider mites (laboratory experiment)

| Test variant | Repetition | Imago count per leaf by day of registration | | | | Decrease in number of mites to the initial one, adjusted for control, %, after treatment by day of registration | | |
|---|---|---|---|---|---|---|---|---|
| | | before treatment | after treatment | | | | | |
| | | | 3 | 7 | 10* | 3 | 7 | 10 |
| Dipping an | 1 | 25 | 12 | 12 | 27 | 52.0 | 52.0 | 44.0 |
| imago-populated | 2 | 22 | 12 | 12 | 28 | 45.5 | 45.5 | 34.0 |
| leaf | 3 | 22 | 12 | 12 | 30 | 45.5 | 45.5 | 29.3 |
| in 5% aqueous | 4 | 20 | 10 | 10 | 24 | 50.0 | 50.0 | 37.8 |
| fertilizer solution | avg. | 22.3 | 11.5 | 11.5 | 27.3 | 48.3 | 48.3 | 36.3 |
| Dipping an | 1 | 26 | 9 | 9 | 9 | 65.4 | 65.4 | 56.2 |
| imago-populated | 2 | 30 | 10 | 10 | 10 | 66.7 | 66.7 | 67.2 |
| leaf | 3 | 19 | 9 | 9 | 9 | 57.9 | 57.9 | 56.4 |
| in 10% aqueous | 4 | 23 | 8 | 8 | 8 | 60.9 | 60.9 | 57.2 |
| fertilizer solution | avg. | 24.5 | 9.0 | 9.0 | 9.0 | 62.7 | 62.7 | 59.3 |
| Dipping an | 1 | 20 | 6 | 6 | 12 | 70.0 | 70.0 | 68.9 |
| imago-populated | 2 | 22 | 7 | 6 | 14 | 68.2 | 72.7 | 67.0 |
| leaf | 3 | 17 | 6 | 6 | 12 | 64.7 | 64.7 | 63.4 |
| in 15% aqueous | 4 | 20 | 7 | 7 | 15 | 65.0 | 65.0 | 61.1 |
| fertilizer solution | avg. | 19.8 | 6.5 | 6.3 | 13.2 | 66.9 | 68.1 | 65.1 |
| Dipping an | 1 | 18 | 4 | 4 | 9 | 77.8 | 77.8 | 74.1 |
| imago-populated | 2 | 19 | 3 | 3 | 8 | 84.2 | 84.2 | 78.2 |
| leaf | 3 | 17 | 4 | 3 | 8 | 76.5 | 82.4 | 75.6 |
| in 20% aqueous | 4 | 18 | 4 | 4 | 8 | 66.7 | 77.8 | 65.5 |
| fertilizer solution | avg. | 18.0 | 3.8 | 3.5 | 8.3 | 76.3 | 77.8 | 73.4 |
| Control | 1 | 11 | 11 | 11 | 23 | — | — | — |
| | 2 | 18 | 18 | 18 | 33 | — | — | — |
| | 3 | 13 | 13 | 13 | 25 | — | — | — |
| | 4 | 15 | 15 | 15 | 29 | — | — | — |
| | avg. | 14.3 | 14.3 | 14.3 | 27.5 | — | — | — |

The results obtained from assessing the biological activity of the fertilizer for the common spider mite indicate that it has contact toxic properties against the particular pest. However, increasing the concentration of fertilizer even to 20% did not allow increasing its toxicity to mites by more than 78.0%. This toxicity level is clearly not sufficient for a pest that quickly restores its numbers and develops in more than 10 generations per season, forming large populations on various crops.

The results obtained from assessing the effect of the fertilizer on the common potato aphid using different methods of processing indicate that somewhat greater toxicity, as in the case of the common spider mite, occurs when the insect is directly treated, in comparison with its replanting on the treated surface of the food plant (see Table 5).

The insecticidal effect of the fertilizer is due to the action of a complex of adjuvants, which, when they enter the respiratory system of an insect, disrupt the respiratory processes.

To confirm the antiviral effectiveness of the fertilizer against the tomato yellow leaf curl virus (TYLCV), studies were conducted on the Momotaro variety.

The control option is the standard tomato growing technology adopted on the farm, which involves complete mineral nutrition of plants, as well as protection of tomato plants starting from the germination phase through 12 treatments during the growing season (fungicide, Vino 95 bactericide, Imidacloprid insecticide in recommended dosages).

Variant 1—spraying plants with a 0.5% aqueous solution of fertilizer 6 times during the growing season.

Variant 2—spraying plants with a 1% aqueous solution of fertilizer 6 times during the growing season.

The experiment was carried out in triplicate, and one repetition was considered to be one row in the field with 20 tomato plants in a row. Each treatment contained 60 tomato plants (see Table 6).

TABLE 5

Toxicity of fertilizer for common potato aphids (laboratory experiments)

| Test variant | Repetition | Imago and larvae count per leaf by day of registration: before treatment | after treatment 1 | after treatment 3* | Reduction in the number of aphids relative to the initial one, adjusted for control, %, by day of registration 1 | 3* |
|---|---|---|---|---|---|---|
| Planting imagoes on a leaf treated with the fertilizer solution | | | | | | |
| Leaf dipping in | 1 | 18 | 18 | 18 | 0 | 0 |
| 0.01% aqueous | 2 | 56 | 55 | 35 | 1.8 | 45.6 |
| fertilizer solution | 3 | 81 | 78 | 50 | 3.7 | 46.2 |
| followed by replanting aphids | avg. | 48.3 | 47.0 | 31.0 | 1.8 | 30.6 |
| Leaf dipping in | 1 | 54 | 54 | 28 | 0 | 54.8 |
| 0.1%[1] aqueous | 2 | 47 | 47 | 24 | 0 | 55.5 |
| fertilizer solution | 3 | 47 | 47 | 25 | 0 | 52.3 |
| followed by replanting aphids | avg. | 49.3 | 49.3 | 31.2 | 0 | 54.2 |
| Control | 1 | 24 | 24 | 28 | — | — |
| | 2 | 33 | 33 | 36 | — | — |
| | 3 | 30 | 30 | 36 | — | — |
| | avg. | 29.0 | 29.0 | 33.3 | — | — |
| Treatment of a leaf populated with imagoes | | | | | | |
| Dipping an | 1 | 34 | 34 | 29 | 0 | 50.0 |
| aphid-populated | 2 | 21 | 21 | 17 | 0 | 52.5 |
| leaf into a 0.1% | 3 | 20 | 20 | 19 | 0 | 32.1 |
| aqueous solution fertilizers | avg. | 25.0 | 25.0 | 21.0 | 0 | 44.9 |
| Dipping an | 1 | 41 | 41 | 30 | 0 | 57.1 |
| aphid-populated | 2 | 37 | 36 | 26 | 2.7 | 58.8 |
| leaf into a 1% | 3 | 40 | 39 | 24 | 2.5 | 64.8 |
| aqueous solution fertilizers | avg. | 39.3 | 38.6 | 26.6 | 1.7 | 60.2 |
| Control | 1 | 30 | 30 | 39 | — | — |
| | 2 | 40 | 40 | 44 | — | 40 |
| | 3 | 20 | 20 | 45 | — | — |
| | avg. | 30.0 | 30.0 | 42.6 | — | — |

*after 3 days, 100% death of aphids was observed in all experimental variants, including control.

It should be noted that, regardless of the method of treating the insect, increasing the concentration of the aqueous fertilizer solution by 10 times did not lead to a significant increase in its biological activity. As a result, the maximum toxic effect from a 1% concentration of fertilizer when treating a leaf populated by imagoes was only 60.2%.

Taking into account the results of laboratory studies, the combined use of fertilizers with insecticides and acaricides can be recommend to enhance the biocidal activity of the tank mixture by 30-50%, while reducing the consumption of insecticides and acaricides by 15-20%.

TABLE 6

Antiviral activity of fertilizer on Momotaro tomato

| Observation dates | Control version (with repetitions) Total plants in row\infected | | | | Variant 1 (with repetitions) Total plants in row\infectedv | | | Variant 2 (with repetitions) Total plants in row\infected | |
|---|---|---|---|---|---|---|---|---|---|
| 14 Jan. 2019 | 20\0 | 20\3 | 20\4 | 20\1 | 20\2 | 20\2 | 20\2 | 20\1 | 20\1 |
| 21 Jan. 2019 | 20\2 | 20\4 | 20\4 | 20\1 | 20\3 | 20\2 | 20\2 | 20\2 | 20\1 |
| 28 Jan. 2019 | 20\4 | 20\6 | 20\4 | 20\2 | 20\3 | 20\2 | 20\2 | 20\2 | 20\1 |
| 4 Feb. 2019 | 20\7 | 20\6 | 20\5 | 20\2 | 20\3 | 20\2 | 20\2 | 20\2 | 20\1 |
| 11 Feb. 2019 | 20\7 | 20\6 | 20\6 | 20\2 | 20\3 | 20\2 | 20\2 | 20\2 | 20\1 |
| 18 Feb. 2019 | 20\7 | 20\7 | 20\6 | 20\2 | 20\3 | 20\2 | 20\2 | 20\2 | 20\1 |
| Final observation 28 Feb. 2019 | 20\7 | 20\7 | 20\6 | 20\2 | 20\3 | 20\2 | 20\2 | 20\2 | 20\1 |
| Average % of infected plants in the final observation | | 33.3 | | | 11.6 | | | 8.3 | |

Based on observations of the growing season of plants, it can be noted that the use of fertilizer (0.5%, 1% aqueous solution) in the form of leaf treatments restrained the development of the viral disease of tomato yellow curl and prevented its spread to neighboring plants, while the 1% concentration of the fertilizer has an advantage in effectiveness.

Thus, it can be recommend using the fertilizer in a concentration of 1% solution on the tomato crop in the form of leaf treatments, starting from the germination phase every 7-10 days, depending on the level of prevalence of the tomato yellow curl virus, and at least 6 treatments per growing season.

Silver nanoparticles stabilized by Ampholac 7-TX and polyvinylpyrrolidone have the ability to interact with DNA and RNA proteins of viruses. The mechanism of action consists of three stages. At the first stage, interaction occurs with the protein shell of the virus to keep it from attaching to plant cells. At the second stage, ions and ROS (reactive oxygen species) are produced, which destroy the protein shell, DNA and RNA of viruses. At the final stage, nanoparticles penetrate into the plant cell, followed by interaction with enzymes to prevent replication and further spread of the virus.

In addition, the antiviral effect of the fertilizer is due to the presence of a complex compound of fullerene with polyvinylpyrrolidone, which inhibits virus reproduction.

Thus, the content of sodium tall amphopolycarboxyglycinate, polyvinylpyrrolidone, as well as water pre-structured with shungite in the fertilizer composition, with the content of components in accordance with the compositions given in Table 1, allows the invention to be implemented with the achievement of the stated technical result.

What is claimed is:

1. A liquid fertilizer composition comprising:

an aqueous colloidal dispersion comprising silver nanoparticles coated by one or more polymers;

sodium tallow amphopolycarboxyglycinate in an amount of 7-46 g/L and polyvinylpyrrolidone in an amount of 5-80 g/L;

macroelements and microelements present as salts and as chelates, including metal-ethylenediaminetetraacetic acid (EDTA) chelates; and a structured water in an amount of 561.2-883.9 g/L and having shungite particles no larger than 0.01 mm in size, wherein the structured water is prepared by (i) demineralizing water by reverse osmosis, (ii) maintaining the demineralized water within a shungite filter having a size of shungite particles from 0.5 to 2 cm, and (iii) dispersing the shungite particles no larger than 0.01 mm in size into the demineralized water.

2. The liquid fertilizer composition of claim 1 further comprising (in g/L):

silver nitrate 0.9-6;

sodium borohydride 0.4-2.8;

ammonium molybdate 1.8-7;

sodium octaborate tetrahydrate 11-40;

copper chelate 33-70;

zinc chelate 23-70;

manganese chelate 27-82; and cobalt chelate 7-35.

3. The liquid fertilizer composition of claim 1, wherein the silver nanoparticles are formed by reducing silver nitrate with sodium borohydride in the structured water.

* * * * *